Sept. 30, 1958. P. STELLER 2,854,263
COUPLING MEMBER FOR SWING STAND
Filed June 10, 1957
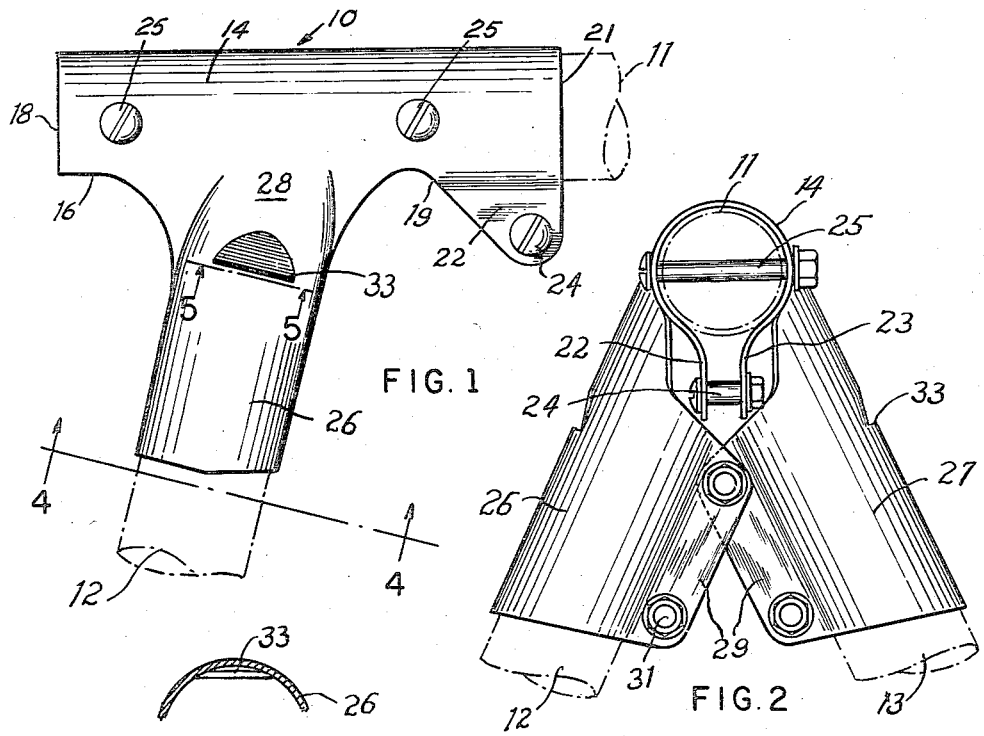
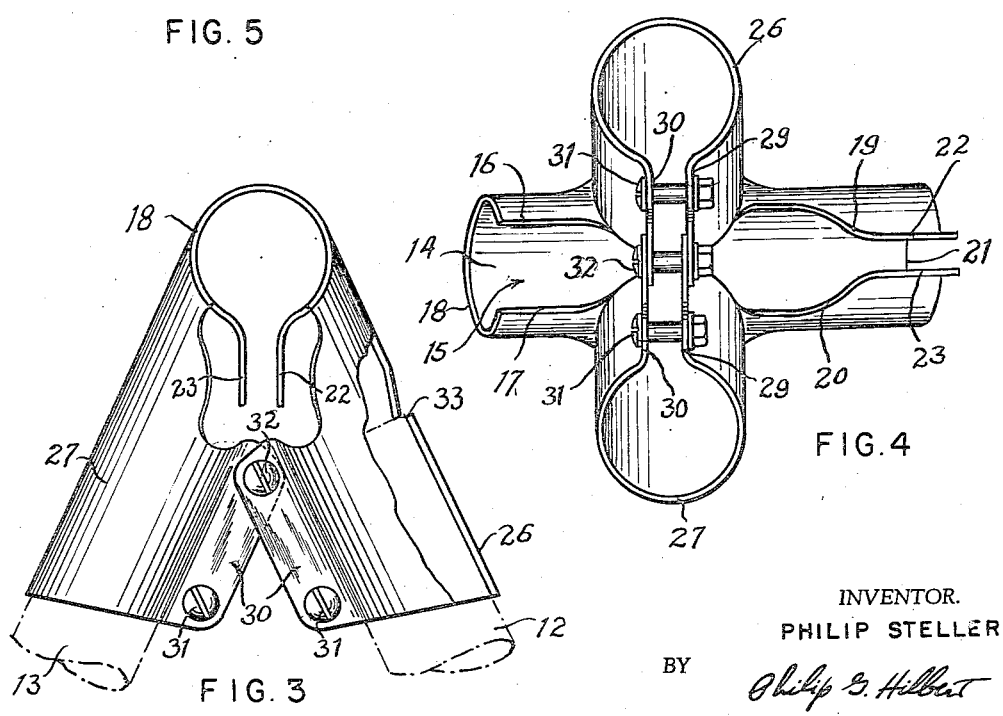
INVENTOR.
PHILIP STELLER
BY Philip G. Hilbert
ATTORNEY United States Patent Office 2,854,263
Patented Sept. 30, 1958

2,854,263

COUPLING MEMBER FOR SWING STAND

Philip Steller, Great Neck, N. Y., assignor to Stelber Cycle Corporation, Brooklyn, N. Y., a corporation of New York Application June 10, 1957, Serial No. 664,571

6 Claims. (Cl. 287—54)

This invention relates to coupling members for joining a horizontal bar with angularly related leg members to provide a stand or support for swings and the like.

An object of this invention is to provide an improved coupling member formed of a single piece of sheet metal which is bent or formed to provide integrated tubular sections for telescopically receiving a horizontal bar and angularly related leg members, the tubular sections being formed in a manner to be highly resistant to stresses and strains in use.

A further object of this invention is to provide a coupling member of the character described wherein angularly related tubular sections of receiving the leg members include means for rendering the coupling member highly resistant to incident stresses and strains, particularly at the juncture of the angularly related sections with the horizontal bar receiving section.

Another object of this invention is to provide a coupling member of the character described wherein the horizontal bar receiving section includes clamping ears arranged to increase the resistance of the coupling member to stresses and strains while providing a minimum amount of metal at areas subject to stress and strain.

Still another object of this invention is to provide a coupling member of the character described which is derived from a single piece of sheet metal, said piece of metal being of minimum gauge yet being adapted to provide maximum resistance to stresses and strains in areas subject to maximum stresses and strains when said coupling member is in use.

Other objects of this invention will in part be obvious and in part hereinafter pointed out.

In the drawings,

Fig. 1 is a side elevational view of a coupling member embodying the invention; the horizontal bar and leg members being shown in dotted lines;

Fig. 2 is one end view thereof;

Fig. 3 is the other end view thereof;

Fig. 4 is a bottom view thereof taken along the line 4—4 of Fig. 1; and

Fig. 5 is a sectional view taken along the line 5—5 of Fig. 1.

Referring in detail to the drawing, 10 designates a coupling member embodying the invention. The same is formed from a single, flat blank of sheet metal of suitable gauge which is formed to provide tubular sections for telescopically receiving and connecting a horizontal bar member indicated at 11 and which may be of tubular shape, with a pair of tubular leg members indicated at 12, 13.

The sheet metal blank is formed with a horizontally disposed tubular section 14 which is split along the bottom thereof from end to end, as at 15. The split edge portions 16, 17 adjacent outer end 18 of section 14, are spread apart, while the split edge portions 19, 20 adjacent inner end 21 of section 14 are somewhat closer and have depending therefrom ears 22, 23.

As indicated in Figs. 1, 2, the horizontal tubular member 11 is telescopically received in coupling section 14 and retained therein by the clamping action of ears 22, 23 which are formed with aligned openings to receive a clamping bolt and nut indicated at 24. Furthermore, coupling section 14 is formed with longitudinally spaced pairs of aligned openings for receiving locking bolts and nuts indicated at 25; the member 11 being formed with correspondingly located openings for proper registry to allow passage therethrough of said bolts 25.

Extending from section 14 and integral therewith are a pair of angularly related tubular sections 26, 27 for telescopically receiving therein leg members 12, 13. Each of the sections 26, 27 includes at the upper end thereof a walled portion 28 which merges with lower edge portions of section 14. The sections 26, 27 describe an angle somewhat greater than 90° with respect to the axis of section 14 and in relation to the inner end 21 thereof; thus allowing leg members 12, 13 coupled to opposite ends of member 11 to be in divergent relation.

Coupling sections 26, 27 are split along their opposed, inner edges; each section having a pair of flanges 29, 30 extending from the split edges thereof. Each pair of flanges 29, 30 is formed with a pair of aligned openings at the lower ends thereof for receiving clamping bolts and nuts indicated at 31.

Also, each pair of flanges 29, 30 is formed with a pair of aligned openings at the upper ends thereof. As shown in Figs. 2, 3, 4, the upper ends of flanges 29, 30 of section 26 are in overlapping relation to the corresponding flange ends of section 27; the openings therein being in registry to receive a combination tie and clamping bolt and nut indicated at 32.

The coupling sections 26, 27 have detents 33 pressed inwardly of the wall portions thereof to provide stop means for the upper ends of leg members 12, 13 as they are telescopically received in the coupling sections.

It will be apparent that with a coupling member at either end of horizontal member 11 and leg members 12, 13 connected to each of the coupling members; a well braced, stand or support for swings and the like is provided. Bolts 25 located on either side of the juncture of sections 12, 13 with section 14, positively connect member 11 with coupling members 10. Clamping ears 22 and bolt 24 insure maximum resistance to stress and strain at a vital point of connection between members 10 and 11.

Also, leg members 12, 13 are not only tightly connected to coupling member 10 by way of flanges 29, 30 and bolts 31, 32, but in addition, coupling sections 26, 27 are retained in their angular relation by tie bolt 32. Furthermore, with overlap of flanges 29, 30 and tie bolt 32, stresses and strains at the juncture of sections 26, 27 with section 14 are well resisted. Thus, coupling member 10 may be formed of a blank of sheet metal of minimum gauge, yet be well adapted to be highly resistant to the stresses and strains incident to the coupling member in use.

As various changes might be made in the embodiment of the invention herein set forth without departing from the spirit thereof, it is understood that all matter herein shown or described shall be deemed illustrative and not by way of limitation except as set forth in the appended claims.

Having thus disclosed my invention, I claim as new and desire to protect by Letters Patent:

1. A coupling for interconnecting a horizontal bar and a pair of angularly related leg members comprising a single sheet of metal formed to provide a tubular portion for telescopically receiving said bar and a pair of angularly related tubular portions integral with said first mentioned tubular portion for telescopically receiving said leg members, said first mentioned tubular portion being split along the entire length thereof and at the lower portion thereof, said split tubular portion including depending parallel ears located at one end of said tubular portion, said ears being formed with aligned openings for receiving a clamping bolt therein, each of said pair of tubular portions extending from the respective split portions of said first mentioned tubular portion at points intermediate the ends thereof, each of said pair of tubular portions being split along the entire length thereof and on the inner side thereof, said last mentioned split tubular portions including parallel flanges, each pair of flanges being formed with upper and lower pairs of aligned openings for receiving clamping bolts therein, the upper end portion of one pair of flanges being in overlapping relation to the upper end portion of the other pair of flanges, the openings in the overlapping portions of said flanges being in registering relation.

2. A coupling as in claim 1, wherein said first mentioned tubular portion is formed with a first pair of aligned, bolt receiving openings located on one side of the juncture of said angularly related tubular sections and said first mentioned tubular portion, and further formed with a second pair of aligned bolt receiving openings located on the other side of the juncture of said angularly related tubular sections and said first mentioned tubular portion.

3. A coupling for interconnecting a horizontal bar and a pair of angularly related leg members comprising a single sheet of metal formed with a first tubular portion split along the lower edge thereof, and a pair of angularly related tubular portions integral with said first tubular portion and extending respectively from the split edges thereof intermediate the ends thereof, each of said pair of tubular portions being split along the inner edge thereof and including a pair of flanges at the split edges thereof, the flanges of one of said pair of tubular portions extending toward the flanges of the other of said pair of tubular portions, the respective flanges being in upwardly converging relation, the upper ends of the flanges of one of said pair of tubular portions overlapping the upper ends of the flanges of the other of said pair of tubular portions, the overlapping portions of said flanges being formed with registering and aligned bolt receiving openings.

4. A coupling as in claim 2 wherein said first tubular portion includes a pair of ears depending from the split edges and located at one end of said first tubular portion, said pair of ears being formed with aligned bolt receiving openings.

5. A coupling as in claim 4 wherein said first tubular portion is formed with first and second pairs of aligned bolt receiving openings respectively located on opposite sides of the juncture of said pair of angularly related tubular portions with said first tubular portion, said second pair of openings being located between said ears and the juncture of said pair of angularly related tubular portions with said first tubular portion.

6. A coupling member for interconnecting a horizontal bar and a pair of angularly related leg members comprising a tubular portion split along the lower portion thereof, and a pair of angularly related tubular portions respectively extending from split edge intermediate portions of said first mentioned tubular portion and integral therewith, each of said pair of tubular portions being split on the inner portion thereof and including a pair of inwardly extending flanges, said pairs of flanges being in downwardly divergent relation, the upper ends of said pairs of flanges being in overlapping relation, means connecting the overlapping portions of said pairs of flanges, means for positively connecting said horizontal bar to said first mentioned tubular portion, means for clamping said first mentioned tubular portion to said horizontal bar, said clamping means being longitudinally spaced from said connecting means, and means on each of said pairs of flanges operative together with said first mentioned connecting means for clamping one of said pair of tubular portions to one of said leg members.

References Cited in the file of this patent

UNITED STATES PATENTS

| | | |
|---|---|---|
| 1,034,338 | Beatty | July 30, 1912 |
| 2,696,396 | Pittaluga | Dec. 7, 1954 |
| 2,705,162 | Linsky | Mar. 29, 1955 |
| 2,711,917 | Blu | June 28, 1955 |
| 2,763,455 | Scaramucci | Sept. 18, 1956 |